(12) United States Patent
Matsuura et al.

(10) Patent No.: US 6,859,889 B2
(45) Date of Patent: Feb. 22, 2005

(54) BACKUP SYSTEM AND METHOD FOR DISTRIBUTED SYSTEMS

(75) Inventors: Yohei Matsuura, Tokyo (JP);
 Toshiharu Aiura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 600 days.

(21) Appl. No.: 09/793,093

(22) Filed: Feb. 27, 2001

(65) Prior Publication Data

US 2001/0037473 A1 Nov. 1, 2001

(30) Foreign Application Priority Data

Apr. 27, 2000 (JP) ........................................ 2000-127786

(51) Int. Cl.[7] .............................................. G06F 11/16
(52) U.S. Cl. .............................. 714/7; 714/13; 707/204
(58) Field of Search ............................ 714/5, 6, 7, 13; 711/162; 707/204

(56) References Cited

U.S. PATENT DOCUMENTS

| | | | | | |
|---|---|---|---|---|---|
| 4,141,066 A | * | 2/1979 | Keiles | .......................... | 700/81 |
| 5,777,874 A | * | 7/1998 | Flood et al. | ................... | 700/82 |
| 6,111,852 A | * | 8/2000 | Leung et al. | ................ | 370/217 |
| 6,199,179 B1 | * | 3/2001 | Kauffman et al. | ............. | 714/26 |
| 6,393,581 B1 | * | 5/2002 | Friedman et al. | ............... | 714/4 |
| 6,550,018 B1 | * | 4/2003 | Abonamah et al. | ............ | 714/6 |
| 6,591,373 B1 | * | 7/2003 | Ardis et al. | ..................... | 714/7 |
| 6,651,074 B1 | * | 11/2003 | Taylor | ......................... | 707/204 |
| 6,658,470 B1 | * | 12/2003 | deBardelaben | .............. | 709/224 |

FOREIGN PATENT DOCUMENTS

JP 11039273 12/1999

* cited by examiner

Primary Examiner—Scott Baderman
Assistant Examiner—Anne L. Damiano
(74) Attorney, Agent, or Firm—Birch, Stewart, Koladch & Birch, LLP

(57) ABSTRACT

A remote system fault detecting unit detects a fault in a remote system. A virtual resource management unit selects a virtual resource necessary for structuring a virtual system having the same system configuration as the remote system in which the fault has been detected, based on the remote system configuration information of the remote system. A virtual system structure unit structures a virtual system by using the selected virtual resource. A virtual system start unit starts the virtual system structured by the virtual system structure unit. When the fault in the remote system has been recovered, a virtual system stop unit stops the virtual system and the virtual resource management unit releases the virtual resource.

20 Claims, 13 Drawing Sheets

Fig.6

| REMOTE SYSTEM NAME | MONITOR ITEM | MONITORING INTERVAL | STATE |
|---|---|---|---|
| SYSTEM a | C P U, NETWORK | 30 SECONDS | C P U ABNORMAL |
| SYSTEM b | C P U, DISK | 60 SECONDS | C P U ABNORMAL |
| : | : | : | : |
| SYSTEM n | ALL | 120 SECONDS | NORMAL |

Fig.7

| CPU RESOURCE | |
|---|---|
| RESOURCE NAME | STATE |
| CPU-1 | IN USE |
| CPU-2 | UNUSED |
| : | : |
| CPU-n | UNUSED |

Fig.11

| PRIORITY | REMOTE SYSTEM NAME | MONITOR ITEM | MONTORING INTERVAL | STATE |
|---|---|---|---|---|
| 100 | SYSTEM a | CPU, NETWORK | 30 SECONDS | CPU ABNORMAL |
| 80 | SYSTEM b | CPU, DISK | 60 SECONDS | NORMAL |
| : | : | : | : | : |
| 70 | SYSTEM n | ALL | 120 SECONDS | NORMAL |

BACKUP SYSTEM AND METHOD FOR DISTRIBUTED SYSTEMS

BACKGROUND OF THE INVENTION

1. Field of the Invention

The present invention relates to a backup system for distributed systems at remote locations.

2. Description of the Related Art

As an example, FIG. 13 shows a backup system for remote system disclosed in Unexamined Japanese Patent Publication No. 11-39273. In FIG. 13, a computer 5 for performing a general task and a backup computer 6 for performing backup are provided. The computer 5 is composed of an on-line processing unit 50, a file transmission controller 51, a file 8 for backup, and a journal file 9. The backup computer 6 is composed of a file reception controller 60, a data recovery processing unit 61, a file 100 for backup, and a journal file 110 for reception. The computer 5 and the backup computer 6 are connected by a backup line 7. A terminal 130 is connected to the computer 5 and the backup computer 6, through a line 71 and a backup line 72.

Operations of the backup system shown in FIG. 13 will now be explained. The backup computer 6 stores an updated image history of the file 100 for backup, in the journal file 110 for reception. In the event that the computer 5 becomes unusable because of a fault, the backup computer 6 recovers a file based on the journal file 110 for reception, and continues the tasks as a backup of the computer 5.

In the conventional backup system, as described above, it is needed to prepare one backup computer for one computer generally used. Then, the conventional backup system has a drawback that a large-scale backup system is necessary for performing backup for a large-scale system.

SUMMARY OF THE INVENTION

It is one of objects of the present invention is to provide a backup system where backup for remote systems distributed in a wide area can be performed by using one single system so as to realize continuous data processing, which enhances the reliability of the total system.

It is also an object of the present invention to provide a backup system in which a management node detects a fault in a remote system and structures a virtual system having the same configuration as the remote system, on a virtual node. Since the virtual system continues to perform the processes instead of the remote system, continuous data processing can be realized.

It is yet another object of the present invention to provide a backup system where a virtual resource necessary for a virtual system of high priority can be secured by once stopping a virtual system of low priority on the virtual node, which makes it possible to perform backup for remote systems based on the priority order.

According to one aspect of the present invention, a backup apparatus for performing backup for an information processing system in which a fault has been generated comprises:

a fault detecting unit for detecting the fault generated in the information processing system; and a backup system structure unit for structuring a backup system having a same system configuration as a system configuration of the information processing system in which the fault has been generated.

According to another aspect of the present invention, the backup apparatus further comprises:

a resource pool for storing a plurality of configuration resources for structuring the backup system; and a resource management unit for selecting a configuration resource necessary for structuring the backup system having the same system configuration as the information processing system in which the fault has been generated, out of the plurality of configuration resources stored in the resource pool, and for assigning a selected configuration resource to the backup system, wherein the backup system structure unit structures the backup system by using an assigned configuration resource assigned by the resource management unit.

According to another aspect of the present invention, the backup apparatus further comprises:

an information-processing-system configuration information unit for storing information-processing-system configuration information which indicates the system configuration of the information processing system, wherein the resource management unit selects the configuration resource based on the information-processing-system configuration information stored in the information-processing-system configuration information unit, and assigns a selected configuration resource to the backup system.

According to another aspect of the present invention, the backup apparatus further comprises:

a data management unit for obtaining information processing system storing data from the information processing system in which the fault has been generated, and for transmitting obtained information processing system storing data to the backup system, wherein the backup system performs backup for the information processing system in which the fault has been generated, by using the obtained information processing system storing data obtained by the data management unit.

According to one aspect of the present invention, a backup method for performing backup for an information processing system in which a fault has been generated comprises:

detecting the fault generated in the information processing system;

structuring a backup system having a same system configuration as a system configuration of the information processing system in which the fault has been generated;

storing a plurality of configuration resources for structuring the backup system, in a resource pool;

selecting a configuration resource necessary for structuring the backup system having the same system configuration as the information processing system in which the fault has been generated, out of the plurality of configuration resources stored in the resource pool;

assigning a selected configuration resource to the backup system; and structuring the backup system by using an assigned configuration resource.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

BRIEF DESCRIPTION OF THE DRAWINGS

In the drawings,

FIG. 6 shows contents of a definition file according to the present invention;

FIG. 7 shows an example of a virtual resource table according to the present invention;

FIG. 11 shows contents of a definition file according to the present invention;

DETAILED DESCRIPTION OF PREFERRED EMBODIMENTS

Embodiment 1

Figure 1:
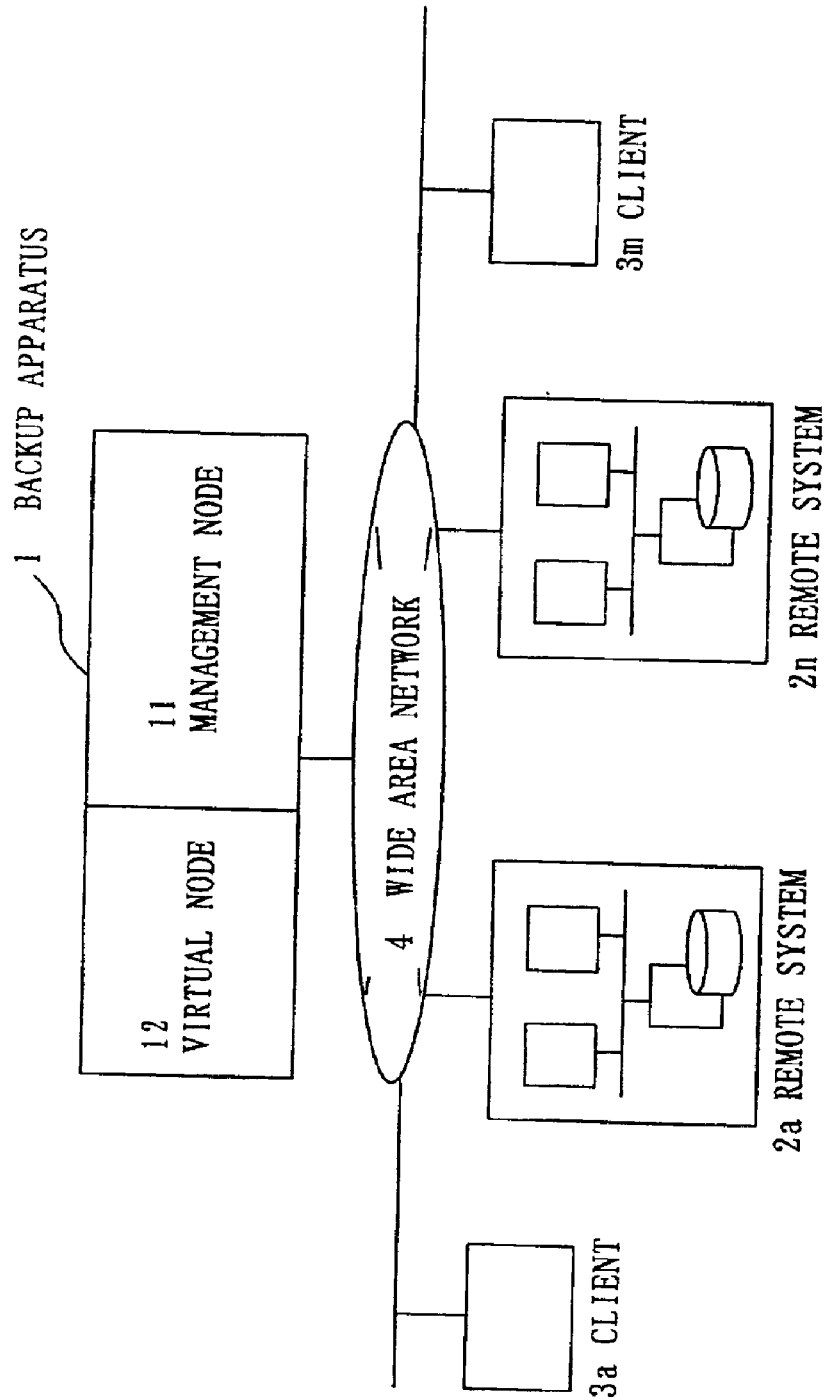
FIG. 1 shows a whole configuration of a large-scale distributed system according to an Embodiment of the present invention.

FIG. 1 shows a configuration of a large-scale distributed system according to Embodiment 1. In FIG. 1, the followings are provided: a backup apparatus 1 for performing backup at the time of fault generation, which is composed of a management node 11 and a virtual node 12, and remote systems 2a and 2b located at a remote places as an information processing system, which generally performs a data processing for a client 3. There are several remote systems 2a through 2n in FIG. 1 which are collectively referred to herein as remote system 2. Clients 3a through 3m, collectively referred to herein as clients 3, are applied to a wide area network and transmit and receive data to/from the remote system 2. The backup apparatus 1, the remote systems 2 and the clients 3 are connected to a wide area network 4.

Figure 2:
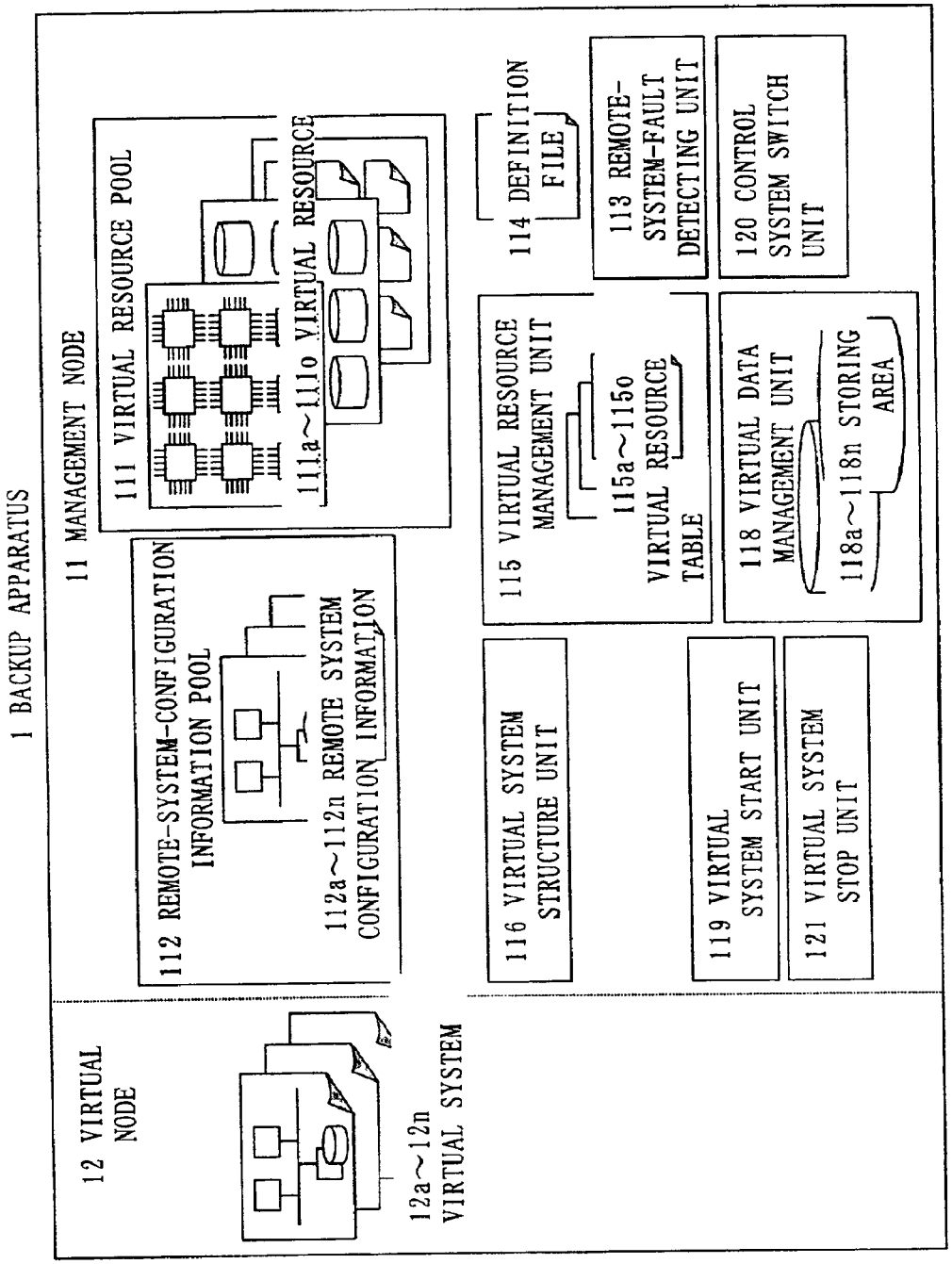
FIG. 2 shows a configuration of the backup apparatus according to Embodiment 1 of the present invention.

FIG. 2 shows a configuration of the backup apparatus 1. In FIG. 2, the management node 11 manages and controls various units in the backup apparatus 1. For instance, the management node 11 manages a virtual resource pool 111 and stores system configuration information of remote systems, into a remote-system-configuration information pool 112.

The virtual node 12 is the area for structuring a virtual backup system by assembling virtual resources (configuration resources) which compose the backup system. In other words, the virtual node 12 is the area for structuring a virtual computing system where a plurality of backup systems shares the virtual resources to use.

The virtual resource pool 111 is composed of virtual resources 111a through 111o classified into each element for structuring a computer. The virtual resources include all the elements composing a computer such as a CPU, a memory, a disk and a network. For instance, they are managed in the forms: CPU is to be a virtual resource 111a, and a memory is to be a virtual resource 111b.

The remote-system-configuration information pool 112 is composed of a plurality of remote system configuration information 112a through 112n representing the configuration of the remote systems 2a through 2n. Resources necessary for structuring a virtual backup system (called a virtual system, hereinafter) having the same configuration as each of the remote systems 2a through 2n, are written in the remote system configuration information 112a through 112n (See FIG. 5). A remote-system-fault detecting unit 113 communicates with a system state informing daemon(not shown) located in each of the remote systems 2a through 2n in order to detect a fault in the remote systems.

A definition file 114 defines information relating to the fault detection by the remote-system-fault detecting unit 113. For instance, a monitoring interval for detecting a fault is defined by the definition file 114.

A virtual resource management unit 115 manages virtual resource tables 115a through 115o respectively prepared for each kind of the virtual resources (for CPU, for memory and so on). Virtual resource names and resource states are stored in the virtual resource tables 115a through 115o.

A virtual system structure unit 116, as a backup system structure unit, structures a virtual system by using the virtual resources 111a through 111o.

A virtual data management unit 118 obtains data stored in each of the remote systems 2a through 2n (information processing system storing data) at specific intervals, updates the obtained data, and stores the updated data in storing areas 118a through 118n.

A virtual system start unit 119 starts the virtual system structured by the virtual system structure unit 116.

In the event of a fault generation, a control system switch unit 120 notifies the client 3 to change the connection party to the backup apparatus 1.

A virtual system stop unit 121 stops the virtual system when the fault in the remote system has been recovered.

Figure 3:
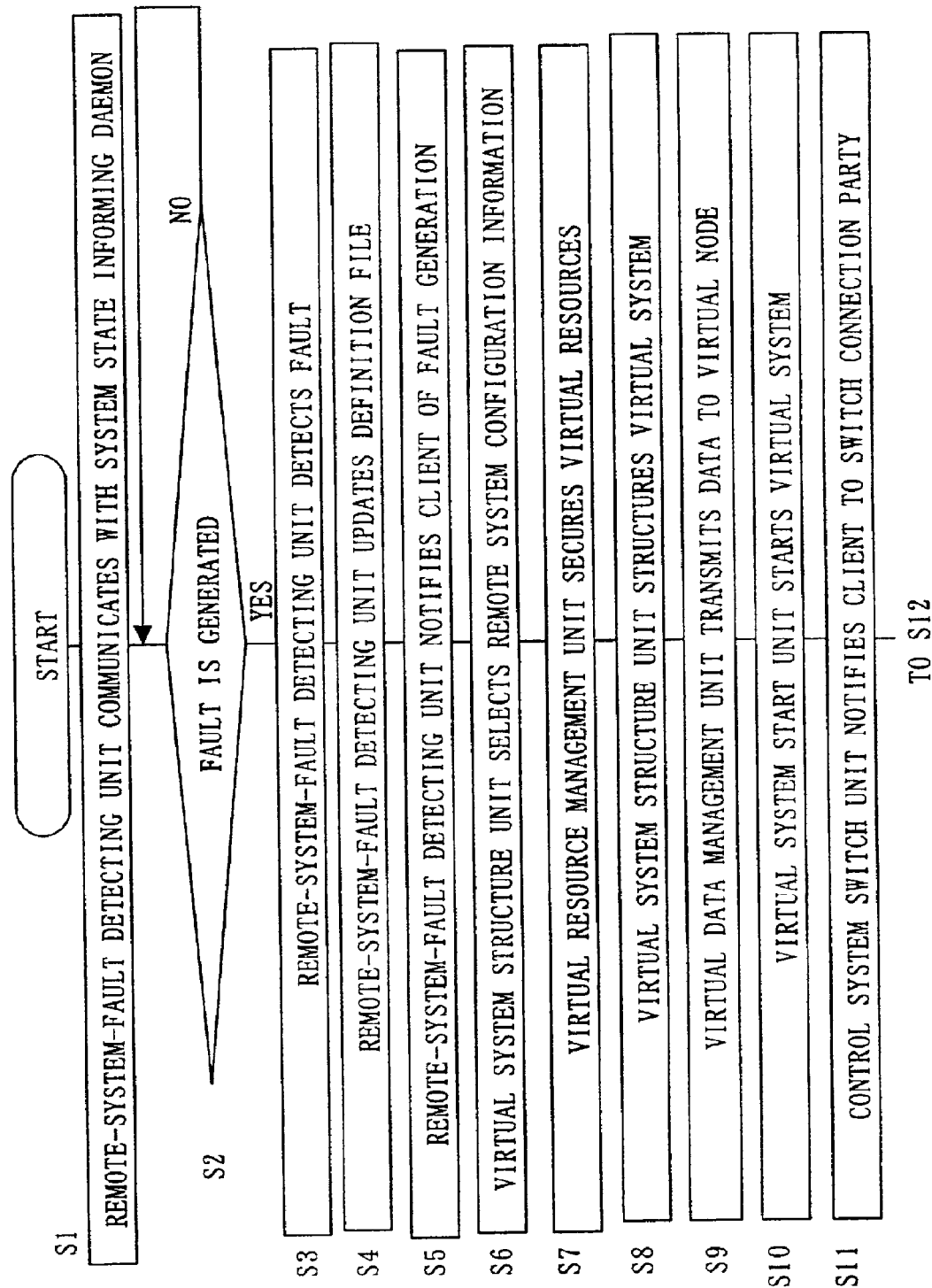
FIG. 3 is a flowchart showing process procedures of the backup apparatus according to Embodiment 1 of the present invention.
Figure 4:
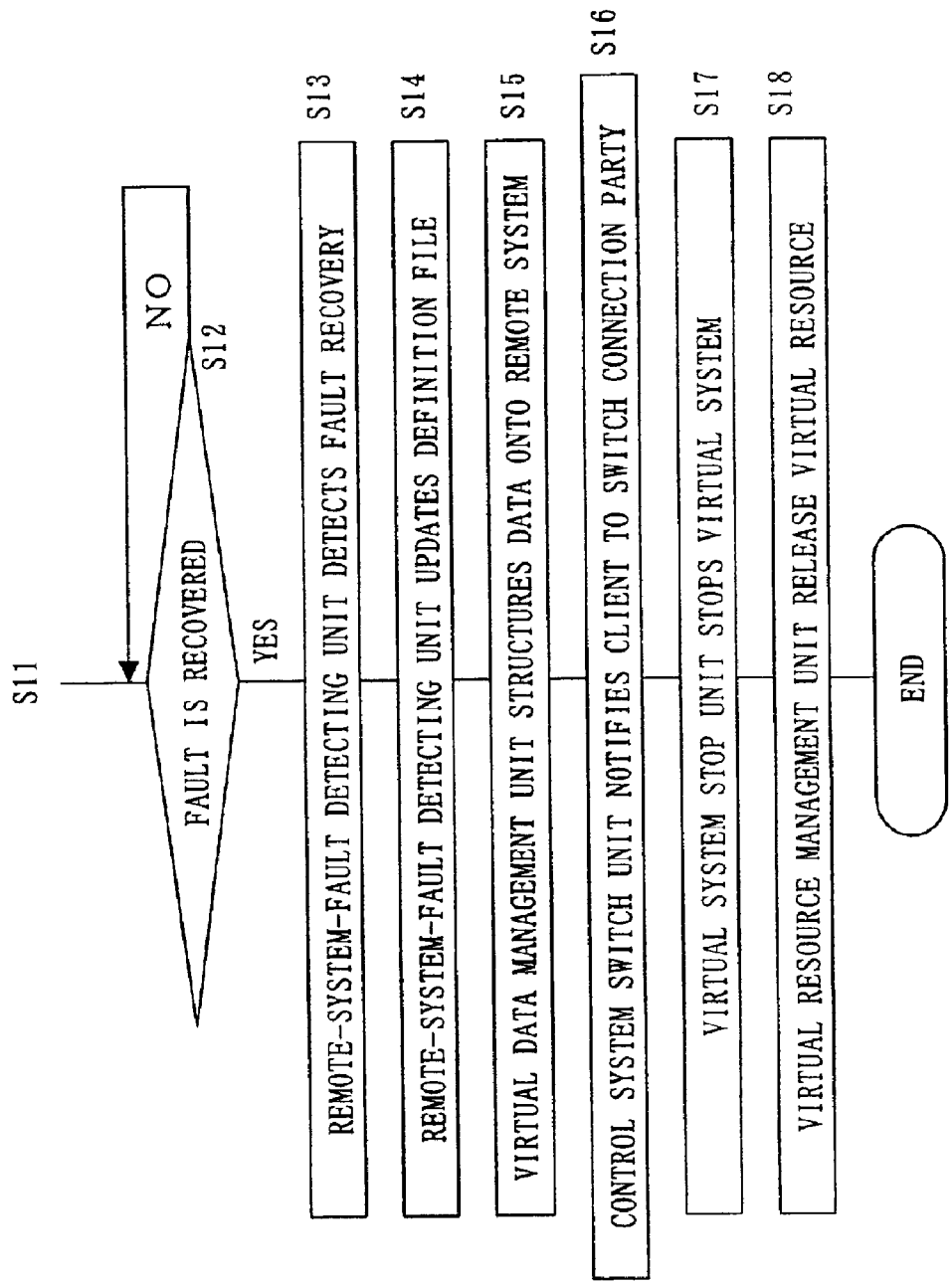
FIG. 4 is a flowchart showing process procedures of the backup apparatus according to Embodiment 1 of the present invention.

Referring to FIGS. 3 and 4, operations of the backup apparatus 1 will be explained. FIGS. 3 and 4 are flowcharts showing processes performed by the backup apparatus 1 according to the present Embodiment 1.

Processes of the present Embodiment 1 can be divided into two stages: a fault detection and virtual system start stage (S1 through S11) shown in FIG. 3 and a fault recovery process stage (S12 through S18) shown in FIG. 4.

Now, operations in the fault detection and virtual system start stage will be explained. At S1, the remote-system-fault detecting unit 113 periodically communicates with the system state informing daemon in each of the remote systems 2a through 2n at specific monitoring intervals. The specific monitoring interval has been defined by the definition file 114. Namely, the remote-system-fault detecting unit 113 communicates with the system state informing daemon at the monitoring intervals defined by the definition file 114, and obtains information regarding states of the remote systems 2a through 2n.

FIG. 6 shows contents of the definition file 114: monitoring interval, remote system name, monitored resource in the remote system (monitor item), and system state are defined. It is acceptable to have a different monitor item at each monitored remote system. With reference to FIG. 6, a CPU and a network are monitor items of the system a, and all the elements are monitor items of the system n. Therefore, in the case of the system a, if a fault is generated in elements excluding the CPU and the network, the remotesystem-fault detecting unit 113 does not judge that the fault has been generated in the system a. Only the fault generated in the CPU or the network can be recognized as a fault in the system a. On the other hand, in the case of the system n, the remote-system-fault detecting unit 113 recognizes a fault generation at any element of the system n. The reason for the configuration where different monitor items can be accepted at each monitoring remote system, is that a backup process for each remote system in accordance with each character is meant to be obtained, in order to cope with differences in system purpose and system configuration of the remote systems.

As stated above, the remote-system-fault detecting unit 113 communicates with the system state informing daemon based on the contents of the definition file 114 which is defined for each of the remote systems 2*a* through 2*n*. In FIG. 3, when a fault is generated in one of the remote systems at S2, the remote-system-fault detecting unit 113 detects the fault at S3, and registers contents of the fault in the system state column of the definition file 114 at S4. In FIG. 6, it is shown that the state of CPU abnormal is detected in each of the remote systems 2*a* and 2*b*. Having detected the faults in the remote systems 2*a* and 2*b*, the remote-system-fault detecting unit 113 notifies the clients 3*a* through 3*m* of the fault generation in the remote systems 2*a* and 2*b* at S5.

Figure 5:
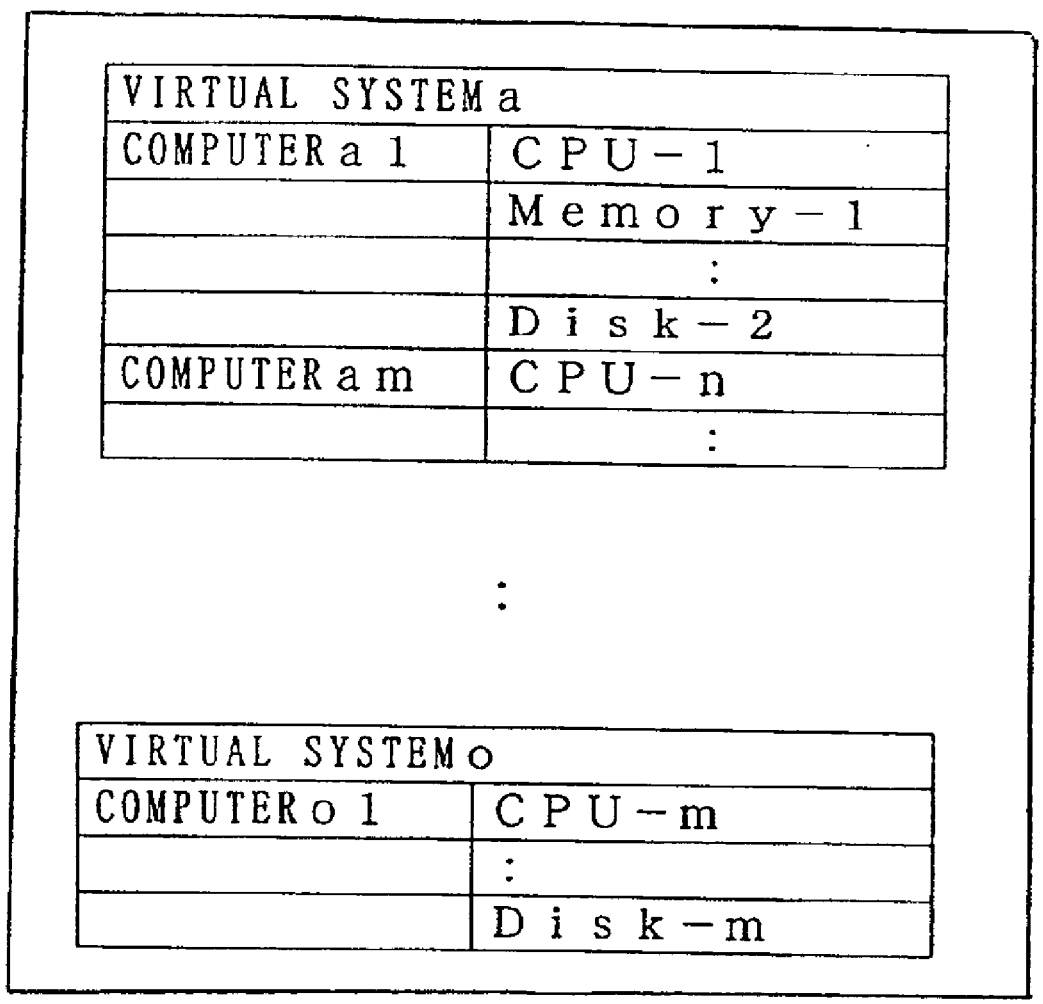
FIG. 5 shows contents of remote system configuration information.

At S6 in FIG. 3, the virtual system structure unit 116 selects the remote system configuration information 112*a* from the remote-system-configuration information pool 112, because the remote system configuration information 112*a* corresponds to the remote system 2*a* where the fault has been detected by the remote-system-fault detecting unit 113. As shown in FIG. 5, the remote system configuration information 112*a* through 112*n* respectively represent a system configuration of each of the remote systems 2*a* through 2*n*. Concretely, the remote system configuration information 112*a* through 112*n* are information relating to a system configuration, such as the number of CPU, a performance of CPU, and a performance of memory of each remote system. By dint of referring to the remote system configuration information 112*a*, it is possible to structure a virtual system having the same configuration as the remote system 2*a* where the fault has been generated.

The remote system configuration information 112*a* selected by the virtual system structure unit 116 is transmitted to the virtual resource management unit 115. At S7, the virtual resource management unit 115 secures virtual resources necessary for performing backup for the remote system 2*a* where the fault has been generated, based on the remote system configuration information 112*a*.

The virtual resource management unit 115 includes virtual resource tables 115*a* through 115*o*. The virtual resource tables 115*a* through 115*o* are respectively prepared for each kind of the virtual resources. FIG. 7 shows a virtual resource table for a CPU resource. In the virtual resource tables 115*a* through 115*o*, virtual resource names and resource states are stored. In FIG. 7, it is indicated that n CPUs, CPU-1 through CPU-n, can be virtually operated as the CPU resource. Namely, the virtual resource can be shared by a plurality of virtual systems.

Therefore, in the backup apparatus 1 according to the present Embodiment 1, it is possible to perform backup for a plurality of remote systems by using one single backup apparatus. The virtual resource can be shared not only by a time sharing system but also by other sharing system.

The state in FIG. 7 shows that CPU-1 is being used. In order to secure a virtual resource, the virtual resource management unit 115 refers to the virtual resource table of each virtual resource, selects one of resources which are not being used, and sets the state of the selected resource to be "in use". Since the virtual resource management unit 115 excludes virtual resources just being used from the virtual resource selection items, only an unused virtual resource can be always selected.

After the virtual resource management unit 115 secures the virtual resources, the virtual system structure unit 116 structures one of virtual systems 12*a* through 12*n* on the virtual node 12 at S8, by using the secured virtual resources.

Each of the virtual systems 12*a* through 12*n* performs backup for each of the remote systems 2*a* through 2*n* in the event that a fault is generated therein. The virtual system structure unit 116 can structure a virtual system having the same resource configuration as that of the remote system where the fault has been generated, on the virtual node 12. In the case of FIG. 6, virtual systems 12*a* and 12*b* having the same system configurations as the remote systems 2*a* and 2*b* can be structured. Consequently, according to the backup apparatus 1 of the present Embodiment 1, it is possible to simultaneously perform backup for a plurality of remote systems by using one backup apparatus.

When the remote-system-fault detecting unit 113 detects a fault in the remote systems 2*a* through 2*n* and the virtual system structure unit 116 structures one of the virtual systems 12*a* through 12*n* on the virtual node 12 at S8, data stored in one of the storing areas 118*a* through 118*n* in the virtual data management unit 118 is transmitted to the virtual system at S9.

The storing areas 118*a* through 118*n* in the virtual data management unit 118 are used for storing data of the remote systems 2*a* through 2*n*. The virtual data management unit 118 receives data from each remote system at specific intervals and stores the received data in each storing area. In the case of a fault generation, it is possible to recover the data of the remote system where the fault has been generated, by transmitting data stored in the storing area for each remote system to the virtual system.

The virtual system structured on the virtual node 12 can reproduce the state of the corresponding remote system, which represents the condition just before the fault generation. Therefore, continuous data processing can be realized.

After the remote-system-fault detecting unit 113 has detected the fault, the virtual system structure unit 116 has structured one of the virtual systems 12*a* through 12*n* on the virtual node 12, and the virtual data management unit 118 has transmitted the data to the virtual system, the virtual system start unit 119 starts the virtual system at S10. Then, the virtual system on the virtual node 12 takes over the process which has been performed by the remote system where the fault was generated, and the virtual system continues to perform the process. Accordingly, continuous data processing can be realized.

Next, after one of the virtual systems 12*a* through 12*n*, structured on the virtual node 12, having been normally started, the control system switch unit 120 in the management node 11 switches the connection party of client from the remote system where the fault was generated to one of the virtual systems 12*a* through 12*n* at S11.

The control system switch unit 120 notifies the client to change the connection party. The client switches the connection party to the virtual system based on the notification from the control system switch unit 120. Since the client is able to switch the connection party from the remote system in which the fault has been generated to the virtual system, continuous data processing can be realized.

Then, the communication between the client 3 and one of the virtual systems 12*a* through 12*n* on the virtual node 12 in the backup apparatus 1 is established. Data processing between the client 3 and one of the virtual systems 12a through 12n is performed until the fault in the remote system 2a has been recovered.

As the backup apparatus 1 according to the present Embodiment 1 has the above configuration, it is possible to structure a virtual system having the same configuration as the remote system where the fault was generated. Consequently, continuous data processing can be performed. Besides, since a virtual resource can be used by a plurality of virtual systems in common, one single backup apparatus is able to simultaneously perform backup for a plurality of remote systems.

Now, the fault recovery process stage (S12 through S18), performed by the backup apparatus 1 when the fault in the remote systems 2a through 2n has been recovered, will be explained with reference to FIG. 4.

In the case the fault in the remote systems 2a through 2n has been recovered at S12, the remote-system-fault detecting unit 113 detects that the fault has been recovered at S13, and it is registered in the system state column of the definition file 114 that the fault has been recovered at S14. The remote-system-fault detecting unit 113 can detect not only a fault generation in the remote systems 2a through 2n but also a state of the remote systems, such as the state of fault recovery. Similar to the fault detection at S3, the remote-system-fault detecting unit 113 communicates with the system state informing daemon and obtains information regarding the state of the remote systems 2a through 2n at the monitoring intervals defined by the definition file 114.

Then, the remote-system-fault detecting unit 113 receives a notification of the fault recovery from the system state informing daemon. Therefore, it is possible for the backup apparatus 1 to grasp the states of the remote systems 2a through 2n in detail.

In addition, similar to the definition file updating at the fault detection at S4, the remote-system-fault detecting unit 113 updates the contents of the definition file shown in FIG. 6 at S14 when the fault is recovered. For instance, the CPU state being "abnormal" in the state column of the remote system 2a in FIG. 6 is updated to be "normal".

At S15, the virtual data management unit 118 transmits the data of the virtual system on the virtual node 12, which is stored in the storing area 118a, to one of the remote systems 2a through 2n where the fault has been recovered.

The virtual data management unit 118 stores not only data of the remote systems 2a through 2n but also data of the virtual systems 12a through 12n on the virtual node 12. Namely, the virtual data management unit 118 stores data concerning the data processing performed between the client 3 and the virtual systems 12a through 12n, into the storing areas 118a through 118n until the fault in the remote systems 2a through 2n has been recovered. At the fault recovery, the data (backup system storing data) stored in the storing areas 118a through 118n is transmitted to the remote systems 2a through 2n. Therefore, the contents of the data concerning the data processing performed between the client 3 and the virtual systems 12a through 12n until the fault recovery, can be recovered on the remote systems 2a through 2n, which makes it possible for the remote systems 2a through 2n to reproduce the states from the fault generation to the fault recovery. Accordingly, continuous data processing can be realized.

The control system switch unit 120 notifies the client 3 to switch the connection party from the virtual system to the recovered system at S16. Namely, the control system switch unit 120 has not only a function of notifying the clients 3a through 3m to switch the connection party from the remote systems 2a through 2n to the virtual systems 12a through 12n at the fault generation, but also a function of notifying the clients 3a through 3m to switch the connection party from the virtual system to the recovered system at the fault recovery. Since the clients 3a through 3n can switch the connection party to the recovered system from the virtual system, continuous data processing is able to be realized.

After the remote-system-fault detecting unit 113 having detected the fault recovery and the virtual data management unit 118 having transmitted data from the virtual system to the remote system, the virtual system stop unit 121 notifies the virtual systems 12a through 12n to stop the system at S17. By dint of this, the virtual system is prevented from being uselessly operated on the virtual node 12, and the data conflict between the virtual system and the remote system can be avoided. Thus, it is possible to realize continuous data processing without the data conflict.

At S18, the virtual resource management unit 115 releases the virtual resource used in the virtual systems 12a through 12n. The virtual resource management unit 115 not only selects the virtual resources 111a through 111o from the virtual resource pool 111 but also releases the virtual resource used in the virtual systems 12a through 12n.

The virtual resource management unit 115 receives the notification from the virtual system stop unit 121 that the virtual system has been stopped. Then, the virtual resource management unit 115 releases the virtual resource used for composing the virtual system. When the virtual resource is released, the virtual resource state of the released virtual resource in the virtual resource tables 115a through 115o is updated to be "unused". According to the case of Embodiment 1, the state of virtual resource corresponding to the remote system 2a where the fault has been recovered is updated to be "unused".

Since the virtual resource management unit 115 is able to release the virtual resource which is no longer used, virtual resources can be effectively utilized. Accordingly, it is possible to perform backup for a plurality of remote systems distributed in a wide area by using only one system.

As stated above, the management node according to the present Embodiment detects a fault in the remote system and structures a virtual system having the same configuration as the remote system, on the virtual node. As the virtual system continues to perform the processes instead of the remote system, continuous data processing can be performed. Furthermore, as a virtual resource is able to be used by virtual systems in common, it is possible to perform backup for a plurality of remote systems distributed in a wide area by using only one system.

Embodiment 2

In Embodiment 1, it is assumed that the virtual resource management unit 115 is always able to secure the virtual resources 111a through 111o based on the remote system configuration information 112a through 112n. In other words, it is assumed that the virtual resource management unit 115 can always secure resources necessary for structuring a system having the same configuration as the remote system in which a fault has been generated.

However, in the case of faults having been generated in many remote systems, it may happen that a necessary virtual resource can not be secured because virtual resources have been already used by other virtual systems. Therefore, in the backup system according to the present Embodiment 2, priorities are respectively assigned to each of the remote systems 2a through 2n and virtual resources are dynamically adjusted based on the priorities.

Figure 8:
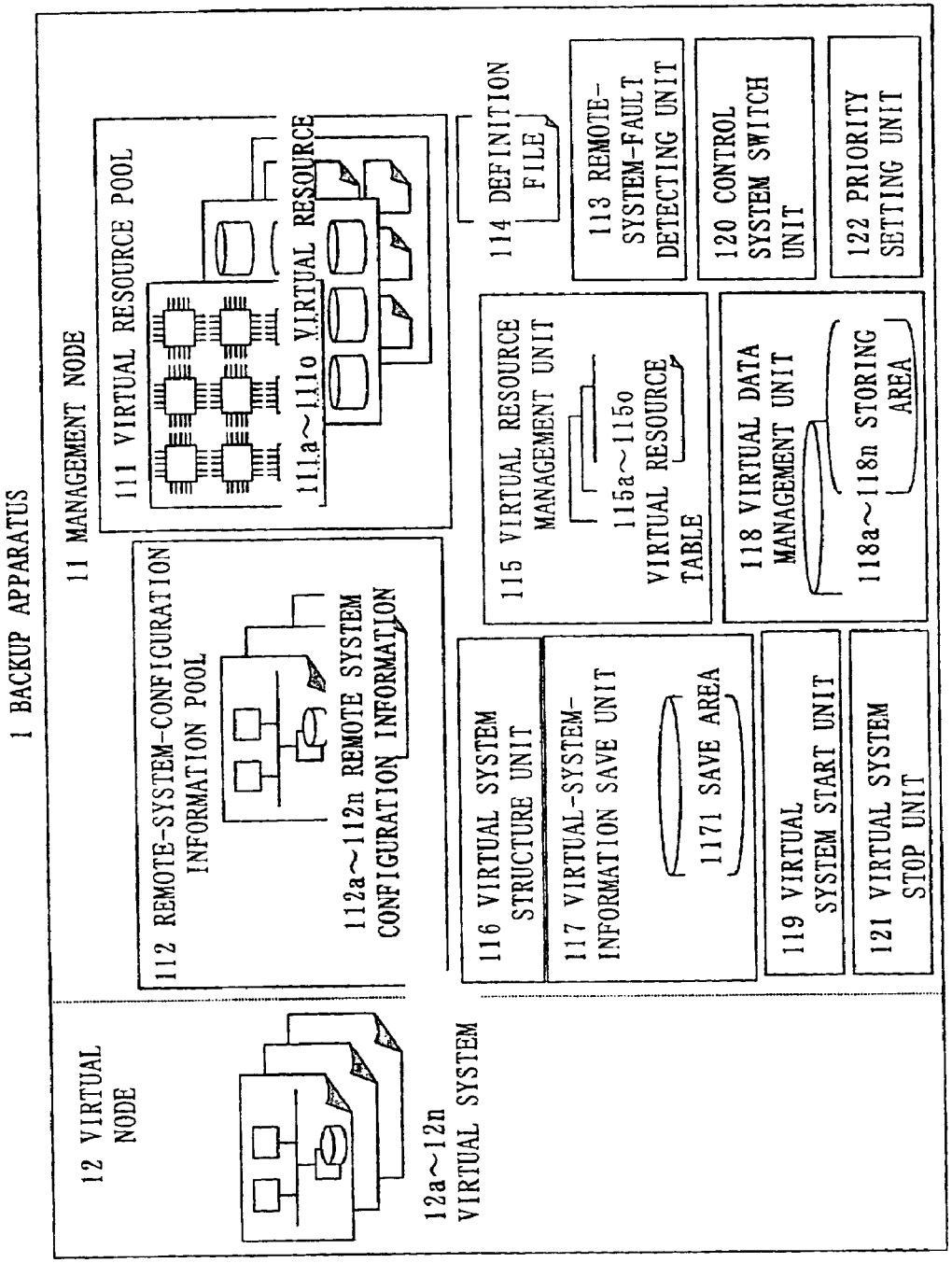
FIG. 8 shows a configuration of the backup apparatus according to Embodiment 2 of the present invention.
Figure 9:
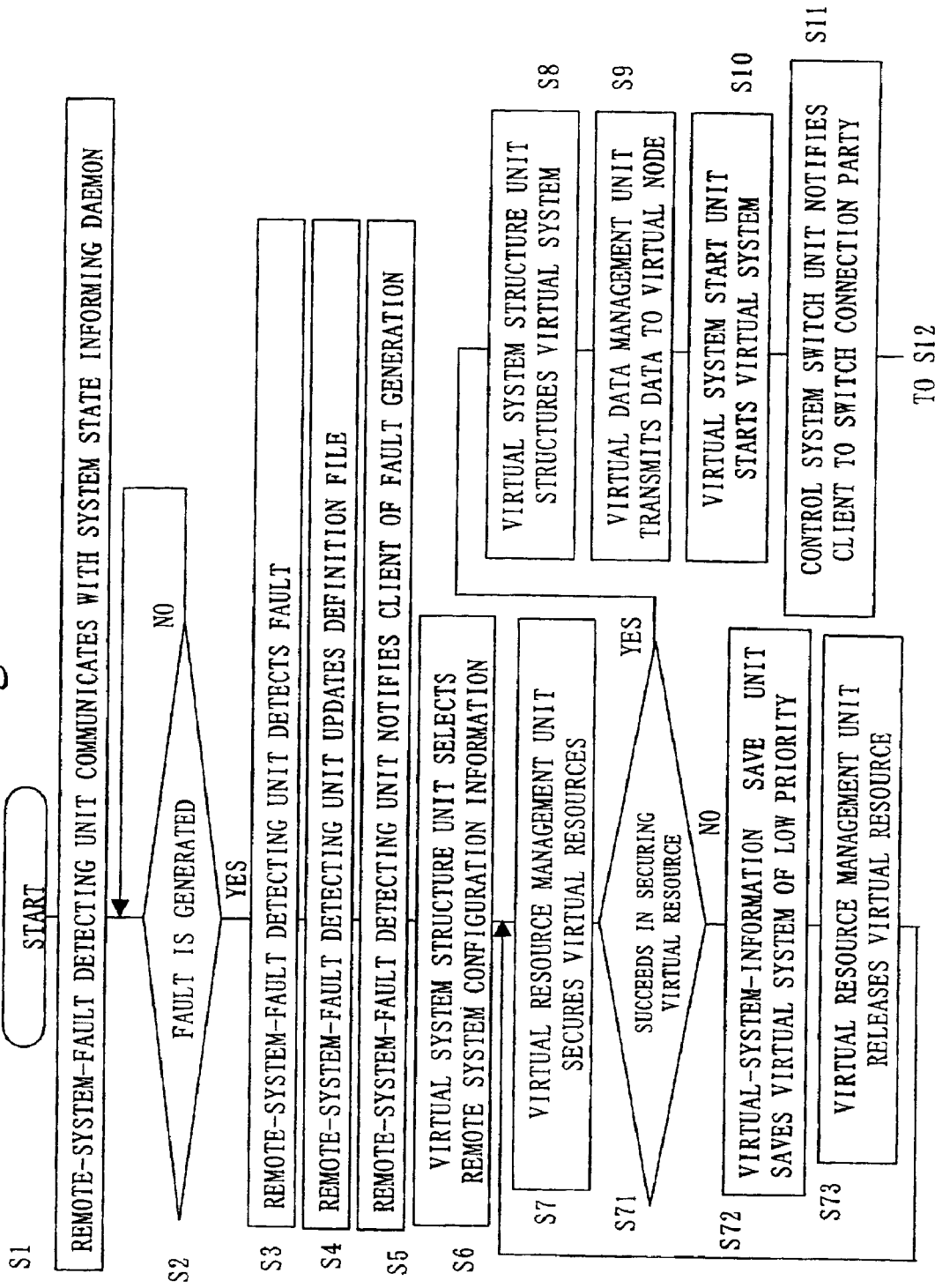
FIG. 9 is a flowchart showing process procedures of the backup apparatus according to Embodiment 2 of the present invention.
Figure 10:
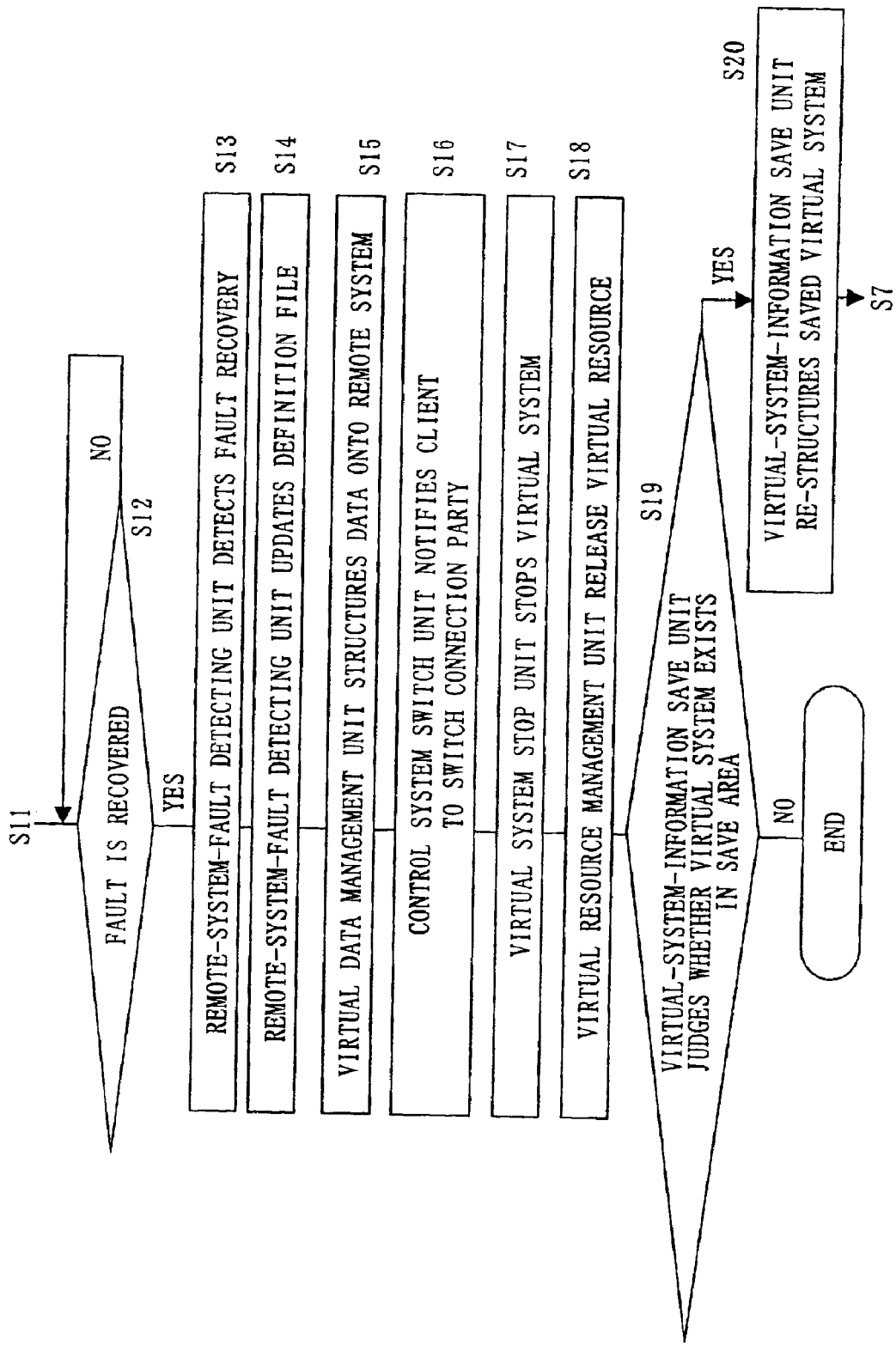
FIG. 10 is a flowchart showing process procedures of the backup apparatus according to Embodiment 2 of the present invention.

Referring to FIGS. 8, 9 and 10, the configuration and the processes of the backup apparatus 1 according to Embodiment 2 will now be explained. FIG. 8 shows the configuration of the backup apparatus 1 and the respect in FIG. 8 differing from Embodiment 1 (FIG. 2) is that a virtual-system-information save unit 117 (backup system information save unit) and a priority setting unit 122 are added to the configuration of FIG. 2. Other configuration elements are the same as Embodiment 1.

When a virtual system corresponding to a remote system of low priority is being operated, if it becomes necessary to start another virtual system which corresponds to a remote system of high priority, the virtual-system-information save unit 117 saves the virtual system corresponding to the remote system of low priority. Detailed explanation of the virtual-system-information save unit 117 will be described later.

The priority setting unit 122 sets priorities for each of the remote systems 2a through 2n at the time of installation of the backup apparatus 1. Then, the priorities once set are not basically changed. However, it is possible for an administrator of the backup apparatus 1 to change the priorities through the priority setting unit 122, depending upon operation states of the remote systems.

FIGS. 9 and 10 are flowcharts showing processes of the backup apparatus 1 according to Embodiment 2. FIG. 9 corresponds to FIG. 3 of Embodiment 1 and shows the fault detection and virtual system start stage. FIG. 9 differs from FIG. 3 in the respect that processes S71 through S73 are added to the processes of FIG. 3. FIG. 10 corresponds to FIG. 4 of Embodiment 1 and shows the fault recovery process stage. FIG. 10 differs from FIG. 4 in the respect that processes S19 and S20 are added to the processes of FIG. 4.

The fault detection and virtual system start stage in FIG. 9 will now be explained. The remote-system-fault detecting unit 113 detects a fault (S1 through S5), and the virtual resource management unit 115 secures a necessary virtual resource based on the remote system configuration information (S6 and S7), which are the same processes as Embodiment 1.

In securing a necessary virtual resource at S7, the virtual resource management unit 115 tries to secure virtual resources 111a through 111o, based on the remote system configuration information 112a through 112n transmitted by the virtual system structure unit 116. In this case, however, it is impossible to secure virtual resources represented as "in use" in the virtual resource table 115a through 115o.

If the virtual resource management unit 115 does not succeed in securing the virtual resource at S71, the virtual resource management unit 115 compares the priority of the virtual system being operated on the virtual node 12 at present with the priority of the virtual system to be structured. The priorities have been already assigned to each of the remote systems 2a through 2n, and they have been registered respectively for each remote system in the definition file 114 of FIG. 11. Therefore, the virtual resource management unit 115 refers to the priorities registered in the definition file and compares the priorities of the virtual systems.

In the case that the priority of the virtual system just being operated on the virtual node 12 is lower than that of the virtual system to be structured, the virtual resource management unit 115 notifies the virtual-system-information save unit 117 to save the virtual system of low priority, and notifies the virtual system stop unit 121 to once stop the virtual system of low priority. It is acceptable there exists a plurality of virtual systems to be stopped. The virtual system of low priority on the virtual node 12 is saved in the save area at S72, and the virtual resource which has been used in the saved virtual system is released at S73.

Figure 12:
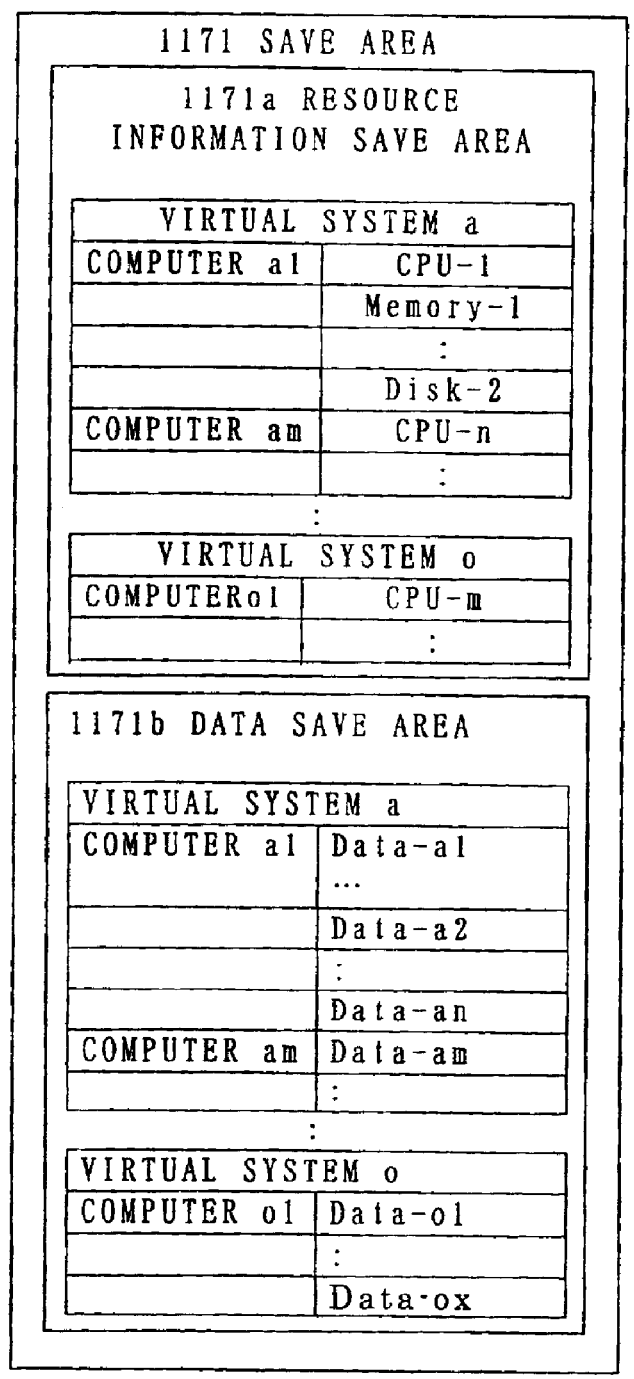
FIG. 12 shows a configuration of save area according to the present invention.
Figure 13:
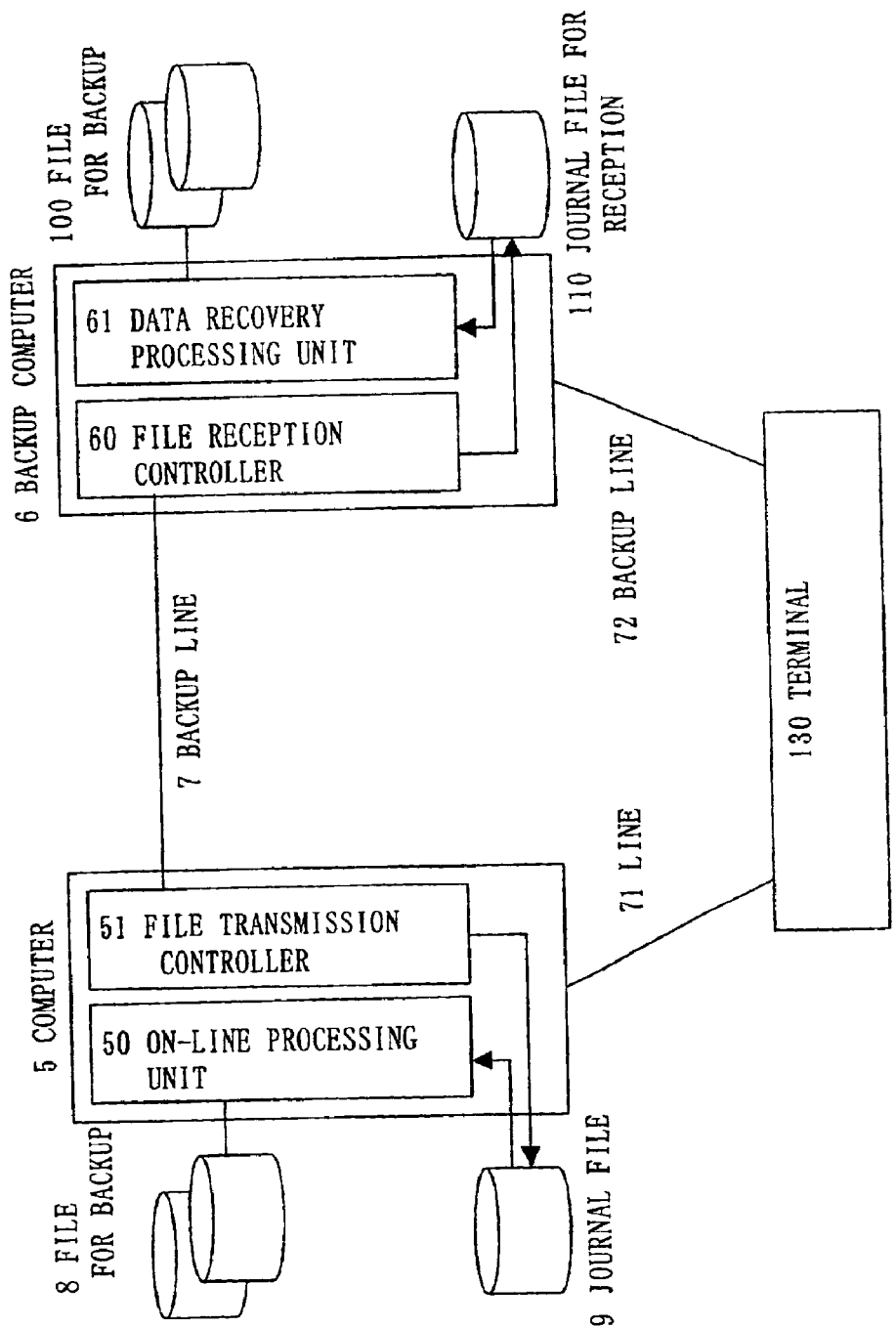
FIG. 13 shows a conventional backup system.

Now the virtual-system-information save unit 117 will be explained. The virtual-system-information save unit 117 includes a save area 1171 for saving information of the virtual system which is designated to be saved by the virtual resource management unit 115. As shown in FIG. 12, the save area 1171 is composed of a resource information save area 1171a and a data save area 1171b.

The resource information save area 1171a stores information relating to the system configuration of the saved virtual system (backup system configuration resource information). As stated later, in the case that the fault in the remote system of high priority is recovered and the virtual resource used by the remote system of high priority has become unused, the saved virtual system is to be structured again based on this resource information.

In the data save area 1171b, data of the saved virtual system (backup system storing data) is saved. In the case that the fault in the remote system of high priority is recovered and the virtual resource used by the remote system of high priority has become unused, the saved virtual system is to be structured again. Processes to be performed by the re-structured virtual system is based on the data saved in this data save area 1171b.

As described above, the virtual-system-information save unit 117 communicates with the virtual system to be saved in order to save the resource information of the virtual system to be saved and the data of the virtual system to be saved, into the save area 1171. After saving the data into the save area 1171, the virtual-system-information save unit 117 notifies the virtual system stop unit 121 to stop the saved virtual system.

Namely, even when there is a possibility of competently using virtual resources, such competition can be avoided because an adjustment to the remote system backup is performed based on the priorities set for each of the remote systems 2a through 2n. Therefore, backup for a remote system of high priority is precedently performed, which makes adequate backup be realized.

The virtual-system-information save unit 117 can save information of the virtual system just being operated on the virtual node 12, into the save area 1171 at an optional time. Therefore, it becomes possible to perform backup for a plurality of remote systems by using a backup apparatus.

After the above processes S71 through S73, the virtual system of low priority is stopped and the virtual resource used in the virtual system of low priority is released. Then, the virtual resource necessary for structuring a virtual system corresponding to the remote system of high priority is secured at S7 and the virtual system corresponding to the remote system of high priority is structured at S8.

The processes S9 through S11 are the same as those of Embodiment 1. Based on these processes, backup for the remote system of high priority is performed.

Now, the fault recovery process stage (S12 through S20) shown in FIG. 10 will be described. The processes S12 through S18 are the same as those of Embodiment 1. As mentioned above, at the time of a fault recovery being detected, the data stored in the virtual system is recovered on the remote system, and the virtual system is stopped to release the virtual resource.

When the virtual resource is released by the virtual resource management unit 115, the virtual-system-information save unit 117 judges whether there exists a virtual system in the save area 1171 or not. Namely, at S19, it is judged whether or not the virtual system of low priority, which has been saved in the save area 1171 at the steps S71 through S73, still exists in the save area 1171. If any virtual systems 12*a* through 12*n* exists in the save area 1171, the virtual-system-information save unit 117 notifies the virtual system structure unit 116 to start to structure one of the saved virtual systems, on the virtual node 12 based on the priority order assigned to the saved virtual systems, from high to low at S20.

The virtual-system-information save unit 117 not only saves information of the virtual systems 12*a* through 12*n* being operated on the virtual node 12 in the save area 1171, but also notifies the virtual system structure unit 116 to structure a virtual system again on the virtual node, based on the virtual system information saved in the save area 1171. Accordingly, backup for a plurality of remote systems distributed in a wide area can be performed by using one single system.

Then, a virtual resource is secured at S7 in order to re-structure a virtual system having been saved, and the virtual system is re-structured at S8. Therefore, the virtual system having been saved in the save area 1171 can be structured on the virtual node 12 again.

As described above, since the virtual system is re-structured on the virtual node 12 based on the information of the virtual system in the save area 1171, it is possible to flexibly assign a virtual resource to the virtual system. Furthermore, it is possible to perform backup for remote systems based on the priority order.

According to a feature of the present invention, a backup apparatus is composed of a management node and a virtual node. The management node includes a virtual resource pool having virtual resources and a remote-system-configuration information pool having configuration information of remote systems.

According to another feature of the present invention, the management node includes a remote-system-fault detecting unit for monitoring states of the remote systems at specific intervals in order to detect a fault.

According to another feature of the present invention, the management node includes a virtual resource management unit for selecting an optional virtual resource from the virtual resource pool.

According to another feature of the present invention, the management node includes a virtual system structure unit for structuring a virtual system having the same resource configuration as that of a remote system where a fault has been generated, on the virtual node, when the fault is detected.

According to another feature of the present invention, the management node includes a virtual-system-information save unit and a virtual-system-information save area for saving information of virtual system being operated on the virtual node, into the save area at an optional time.

According to another feature of the present invention, the management node includes a virtual data management unit for structuring data of a remote system in which a fault has been generated, on the virtual system when the fault is detected.

According to another feature of the present invention, the management node includes a virtual system start unit for starting the virtual system structured on the virtual node.

According to another feature of the present invention, the management node includes a control system switch unit for switching a connection of client from the node in which the fault has been generated to the virtual system, after the virtual system structured on the virtual node has been normally started.

According to another feature of the present invention, the remote-system-fault detecting unit monitors the state of the remote system in order to detect a recovery of the fault in the remote system.

According to another feature of the present invention, the virtual data management unit structures the data in the virtual system, on the recovered remote system when the fault recovery is detected.

According to another feature of the present invention, the control system switch unit switches the connection of client from the virtual system to the recovered remote system, when the fault recovery is detected.

According to another feature of the present invention, the management node includes a virtual system stop unit for stopping the virtual system just being operated when the fault recovery is detected.

According to another feature of the present invention, it is also acceptable for the management node to include a virtual resource release unit for releasing the virtual resource which has been used for composing the virtual system.

According to another feature of the present invention, it is also possible for the virtual-system-information save unit to restore virtual node information which has been saved in the virtual-system-information save area, on the virtual node.

According to another feature of the present invention, in the case of there being not enough necessary virtual resources, the virtual resource management unit notifies the virtual-system-information save unit to once stop a virtual system of low priority being operated on the virtual node, and secures the virtual resource in order to structure a virtual system of high priority.

According to another feature of the present invention, the virtual-system-information save unit notifies the virtual system structure unit to restart the process for the virtual system of low priority when the process for the virtual system of high priority has finished.

Having thus described several particular embodiments of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only, and not intended to be limiting. The invention is limited only as defined in the following claims and the equivalents thereto.

What is claimed is:

1. A backup apparatus for performing backup for a remote information processing system operatively connected to the backup apparatus via a network the backup apparatus comprising:

a fault detecting unit for detecting a fault generated in the remote information processing system;

a backup system structure unit for structuring on the backup apparatus a backup system having a same system configuration as a system configuration of the information processing system in which the fault has been generated;

a resource pool for storing a plurality of configuration resources for structuring the backup system;

a resource management unit for selecting a configuration resource necessary for structuring the backup system having the same system configuration as the remote information processing system in which the fault has been generated, out of the plurality of configuration resources stored in the resource pool, and for assigning a selected configuration resource to the backup system, wherein the backup system structure unit structures the backup system by using an assigned configuration resource assigned by the resource management unit;

wherein the backup apparatus performs backup for a plurality of remote information processing systems in each of which a corresponding fault has been generated, wherein the resource management unit selects the configuration resource for each of the plurality of remote information processing systems in each of which the corresponding fault has been generated, and assigns a selected configuration resource to the backup system for each of the plurality of remote information processing systems, and wherein the backup system structure unit structures a plurality of the backup systems to be corresponding to each of the plurality of remote information processing systems in each of which the corresponding fault has been generated, by using an assigned configuration resource assigned to the backup system for each of the plurality of remote information processing systems by the resource management unit.

2. The backup apparatus of claim 1 further including:

an information-processing-system configuration information unit for storing information-processing-system configuration information which indicates the system configuration of the remote information processing system, wherein the resource management unit selects the configuration resource based on the information-processing-system configuration information stored in the information-processing-system configuration information unit, and assigns a selected configuration resource to the backup system.

3. The backup apparatus of claim 1, wherein the plurality of the backup systems structured by backup system structure unit operate as a virtual computing system in which the plurality of configuration resources stored in the resource pool are shared.

4. The backup apparatus of claim 1 further including:

a priority setting unit for setting a backup priority to each of the plurality of remote information processing systems, wherein the resource management unit selects the configuration resource based on the backup priority set for each of the plurality of remote information processing systems, and assigns a selected configuration resource to the backup system for each of the plurality of remote information processing systems.

5. The backup apparatus of claim 1, wherein the fault detecting unit sets a fault detection standard, being a standard in detecting the fault, for each of a plurality of the information processing systems.

6. The backup apparatus of claim 1 further comprising:

a data management unit for obtaining information processing system storing data from the remote information processing system in which the fault has been generated, and for transmitting obtained information processing system storing data to the backup system, wherein the backup system performs backup for the information remote processing system in which the fault has been generated, by using the obtained information processing system storing data obtained by the data management unit.

7. The backup apparatus of claim 1, wherein the remote information processing system has a client terminal which communicates with the remote information processing system, and the backup apparatus further includes a control system switch unit for switching a connection of the client terminal from the remote information processing system to the backup apparatus.

8. The backup apparatus of claim 1, wherein the fault detecting unit further detects a fault recovery of the remote information processing system when the fault in the remote information processing system has been recovered.

9. The backup apparatus of claim 1, said fault detecting unit communicating with the remote information processing system through the network to detect the fault generated on the remote information processing system.

10. A backup apparatus for performing backup for a remote information processing system operatively connected to the backup apparatus via a network the backup apparatus comprising:

a fault detecting unit for detecting a fault generated in the remote information processing system;

a backup system structure unit for structuring on the backup apparatus a backup system having a same system configuration as a system configuration of the information processing system in which the fault has been generated; and a data management unit for obtaining information processing system storing data from the remote information processing system in which the fault has been generated, and for transmitting obtained information processing system storing data to the backup system, wherein the backup system performs backup for the information remote processing system in which the fault has been generated, by using the obtained information processing system storing data obtained by the data management unit; and wherein the data management unit obtains backup system storing data stored in the backup system, and transmits obtained backup system storing data to the remote information processing system when the fault in the remote information processing system has been recovered.

11. A backup apparatus for performing backup for a remote information processing system operatively connected to the backup apparatus via a network the backup apparatus comprising:

a fault detecting unit for detecting a fault generated in the remote information processing system;

a backup system structure unit for structuring on the backup apparatus a backup system having a same system configuration as a system configuration of the information processing system in which the fault has been generated;

a resource pool for storing a plurality of configuration resources for structuring the backup system;

a resource management unit for selecting a configuration resource necessary for structuring the backup system having the same system configuration as the remote information processing system in which the fault has been generated, out of the plurality of configuration resources stored in the resource pool, and for assigning a selected configuration resource to the backup system, wherein the backup system structure unit structures the backup system by using an assigned configuration resource assigned by the resource management unit;

a backup system stop unit for stopping operation of the backup system, wherein the resource management unit releases the assigned configuration resource assigned to the backup system whose operation has been stopped by the backup system stop unit.

12. The backup apparatus of claim 11,
wherein the backup system stop unit stops operation of a first backup system which performs backup for a first remote information processing system;
the resource management unit releases the assigned configuration resource assigned to the first backup system whose operation has been stopped by the backup system stop unit, selects one of the plurality of configuration resources which is necessary for structuring a second backup system having a same system configuration as a second remote information processing system, out of the plurality of configuration resources stored in the resource pool after the assigned configuration resource assigned to the first backup system has been released, and assigns a selected configuration resource to the second backup system; and
the backup system structure unit structures the second backup system by using an assigned configuration resource assigned by the resource management unit.

13. The backup apparatus of claim 12 further including a priority setting unit for setting a backup priority to each of the first remote information processing system and the second remote information processing system, wherein
the resource management unit compares a backup priority of the first remote information processing system set by the priority setting unit and a backup priority of the second remote information processing system set by the priority setting unit;
when it is judged that the backup priority of the second remote information processing system is higher than the backup priority of the first remote information processing system by the resource management unit,
the backup system stop unit stops the operation of the first backup system;
the resource management unit releases the assigned configuration resource assigned to the first backup system whose operation has been stopped by the backup system stop unit, selects the one of the plurality of configuration resources which is necessary for structuring the second backup system having the same system configuration as the second remote information processing system, out of the plurality of configuration resources stored in the resource pool after the assigned configuration resource assigned to the first backup system has been released, and assigns a selected configuration resource to the second backup system; and
the backup system structure unit structures the second backup system by using an assigned configuration resource assigned by the resource management unit.

14. The backup apparatus of claim 11 further including:
a save area for saving backup system configuration resource information indicating configuration resources of the backup system, and backup system storing data stored by the backup system; and
a backup system information save unit for saving the backup system configuration resource information and the backup system storing data, into the save area.

15. The backup apparatus of claim 14 further including a priority setting unit for setting a backup priority to each of a first remote information processing system and a second remote information processing system, wherein
the resource management unit compares a backup priority of the first remote information processing system set by the priority setting unit and a backup priority of the second remote information processing system set by the priority setting unit;
when it is judged that the backup priority of the second remote information processing system is higher than the backup priority of the first remote information processing system by the resource management unit,
the backup system information save unit saves the backup system configuration resource information and the backup system storing data of the first backup system which performs backup for the first remote information processing system, into the save area; and
the backup system stop unit stops operation of the first backup system.

16. The backup apparatus of claim 14, wherein
the resource management unit selects the configuration resource for structuring the backup system, based on the backup system configuration resource information which has been saved in the save area by the backup system information save unit, and assigns a selected configuration resource to the backup system;
the backup system structure unit structures the backup systems by using an assigned configuration resource assigned by the resource management unit; and
the backup system structured by the backup system structure unit performs backup for the remote information processing system in which the fault has been generated, by using the backup system storing data saved in the save area by the backup system information save unit.

17. A backup method for performing backup for a remote information processing system operatively connected to a backup apparatus via a network, the backup method comprising:
detecting a fault generated in the remote information processing system;
structuring a backup system on the backup apparatus to have a same system configuration as a system configuration of the remote information processing system in which the fault has been generated;
storing a plurality of configuration resources for structuring the backup system, in a resource pool;
selecting a configuration resource necessary for structuring the backup system having the same system configuration as the remote information processing system in which the fault has been generated, out of the plurality of configuration resources stored in the resource pool;
assigning a selected configuration resource to the backup system;
structuring the backup system on the backup apparatus by using an assigned configuration resource;
selecting the configuration resource for each of the plurality of remote information processing systems in each of which the fault has been generated;
assigning a selected configuration resource to the backup system for each of the plurality of remote information processing systems in each of which a corresponding fault has been generated; and
structuring a plurality of the backup systems to be corresponding to each of the plurality of remote information processing systems in which the corresponding fault has been generated, by using an assigned configuration resource assigned to each of the remote information processing systems.

18. The backup method of claim 17 further including:

setting a backup priority to each of a first remote information processing system and a second remote information processing system;

comparing a backup priority of the first remote information processing system and a backup priority of the second remote information processing system;

when it is judged that the backup priority of the second remote information processing system is higher than the backup priority of the first remote information processing system, stopping operation of a first backup system which performs backup for the first remote information processing system;

releasing the configuration resource assigned to the first remote backup system whose operation has been stopped;

after the configuration resource assigned to the first backup system has been released, selecting one of the plurality of configuration resources which is necessary for structuring a second backup system having a same system configuration as the second remote information processing system, out of the plurality of configuration resources stored in the resource pool;

assigning a selected configuration resource to the second backup system; and structuring the second backup system by using a assigned configuration resource assigned.

19. The backup method of claim 17 further including:

setting a backup priority to each of a first remote information processing system and a second remote information processing system;

comparing a backup priority of the first remote information processing system and a backup priority of the second remote information processing system; and when it is judged that the backup priority of the second remote information processing system is higher than the backup priority of the first remote information processing system, saving backup system configuration resource information which indicates configuration resources of a first backup system which performs backup for the first remote information processing system, and backup system storing data of the first backup system, into a save area.

20. The backup method of claim 19 further including:

selecting the configuration resource for structuring the first backup system based on the backup system configuration resource information which has been saved in the save area;

assigning a selected configuration resource to the first backup system;

structuring the first backup system by using an assigned configuration resource; and performing backup for the first remote information processing system in which the fault has been generated, by using the backup system storing data which has been saved in the save area.

* * * * *